3,214,457
CARBAMOYL PHOSPHINES AND PREPARATION THEREOF
Grace Peters Papp and Sheldon A. Buckler, Stamford, Conn., assignors to American Cyanamid Company, Stamford, Conn., a corporation of Maine
No Drawing. Filed Sept. 11, 1963, Ser. No. 308,083
11 Claims. (Cl. 260—465.4)

The present invention relates to novel carbamoyl-disubstituted tertiary phosphines and oxides of the formula $$R_1R_2\overset{(O)_n}{\underset{\|}{P}}CONH_2$$

These compounds are prepared generically as follows $R_1R_2PH + (iso)cyanic\ acid \longrightarrow$ $$R_1R_2PCONH_2 /+O \longrightarrow R_1R_2\overset{O}{\underset{\|}{P}}CONH_2$$

$R_1$ and $R_2$ in the above formulae represent substituted and unsubstituted, saturated and unsaturated, branched and straight chain alkyl having from 1 to 18 carbon atoms, substituted and unsubstituted cycloalkyl, such as cyclohexyl and cyclopentyl, substituted and unsubstituted aryl, such as phenyl and naphthyl, and $n$ is 0 or 1.

The reaction described hereinabove is best carried out in an aqueous medium at a temperature in the range of, preferably, 22° C. to 110° C. However, temperatures in the range of —10° C. to about 200° C., or more, are contemplated herein.

It is essential that the reactions of the present invention be performed under substantially anaerobic conditions, such as under nitrogen or a similar inert gas, if the tertiary phosphines are desired. Of course, the presence of a significant amount of air or oxygen results in the corresponding tertiary phosphine oxide being produced directly. For example, recovery in an open vessel provides the requisite amount of air.

While an aqueous medium is preferred, non-aqueous conditions using an inert organic solvent, such as $CH_3CN$, tetrahydrofuran, dioxane, dimethyl ether of ethylene glycol, and the like, may be employed.

Typical secondary phosphines $R_1R_2PH$ within the purview of the present invention are dimethylphosphine, dioctylphosphine, didodecylphosphine, diisobutylphosphine, diethylphosphine, bis(trifluoromethyl)phosphine, diphenylphosphine, dibenzylphosphine, bis(2-butoxyethyl)phosphine, bis(parachlorophenyl)phosphine, bis(paramethylphenyl)phosphine, bis(2-cyanoethyl)phosphine, dicyclohexylphosphine, dicyclopentylphosphine, dioctadecylphosphine, and the like. It follows from the above representative list of secondary phosphine reactants that typical substituents therefor are cyano, lower alkyl, phenyl, halogen, lower alkoxy and the like. Characteristically, these and like substituents are inert under the reaction conditions contemplated herein.

The (iso)cyanic acid reactant may be introduced into the reactant mixture or it may be generated therein (in situ) by any conventional manner. For instance, an alkali metal derivative of (iso)cyanic acid, such as KOCN, NaOCN, and the like, may be admixed with the phosphine reactant in the presence of an acid and (iso)cyanic acid thus liberated. Typical useful acids are mineral acids, such as HCl, HBr, $H_2SO_4$, and the like, organic acids, such as acetic acid, propionic acid, and the like.

The reactions of the present invention may be carried out under atmospheric, sub-atmospheric or super-atmospheric conditions. The sequence of addition of the reactants is not critical and the reaction may be batch, semicontinuous or continuous.

The ratio of reactants is likewise not critical. While practicality dictates about equimolar amounts of secondary phosphine reactant and (iso)cyanic acid, an excess of either reactant with respect to the other may be employed.

The corresponding oxides of the tertiary phosphines produced herein may also be prepared as described in copending application Serial No. 824,169, now U.S. Patent 3,145,234, issued August 18, 1964, by the use of a peroxide, such as hydrogen peroxide, dinitrogen tetroxide. Reaction is carried out with significant ease. This copending application is incorporated herein by reference.

The novel monocarbamoyl-substituted tertiary phosphine and phosphine oxides of the present invention, prepared as described above, have direct utility as flameproofing agents. For instance, cotton cloth may be immersed in a suitable solution containing a small amount (e.g. from 0.5% to 10%) of any one of the novel compounds of the present invention, and the cloth subsequently dried. The thus-treated cotton cloth exhibits desirable fire retardance on direct contact with a flame.

The present invention will best be understood from the following examples:

EXAMPLE I

*Dibutylcarbamoylphosphine oxide*

Under nitrogen, 7 grams of acetic acid is added dropwise to a mixture of 4.4 grams of dibutylphosphine, 5.0 grams of dry, freshly ground KOCN and 1 cubic centimeter of pyridine in 50 cubic centimeters of $CH_3CN$ at 60° C.–70° C. The mixture is heated at reflux for 2 hours, then cooled and filtered. Air is blown through the filtrate for 3 hours, and 1.0 gram of product, dibutylcarbamoylphosphine oxide, precipitates. Concentration of the filtrate and subsequent addition of petroleum ether affords an additional 1.1 grams of product, dibutylcarbamoylphosphine oxide, melting point 160° C.–170° C.

Recrystallization from benzene gives an analytical sample, melting point 177° C.–178° C.

Calculated for C, 52.67; H, 9.82; N, 6.82; P, 15.09. Found: C, 52.46; H, 9.86; N, 6.86; P, 14.90.

EXAMPLE II

*Carbamoyldicyclohexylphosphine*
*Carbamoyldicyclohexylphosphine oxide*

A solution of 12 grams of KOCN in 35 cubic centimeters of $H_2O$ is added, under nitrogen, to a mixture of 12 grams of dicyclohexylphosphine in 80 cubic centimeters of acetic acid at 70° C.–80° C. The reaction flask is removed from the oil bath as substantial foaming begins and a voluminous precipitate deposits. After stirring for 3 hours, the resulting mixture is filtered, solid product carbamoyldicyclohexylphosphine precipitates which is washed with water and dried in a desiccator, 12.7 grams of solids, melting point 121° C.–125° C., being obtained. Analysis of the crude product yield is the following: Calculated for C, 64.67; H, 10.03. Found: C, 64.07; H, 9.93.

Attempted recrystallization from hexane containing a small amount (about 5 percent) of methanol causes conversion to the corresponding oxide, carbamoyldicyclohexylphosphine oxide, melting point 177° C.–179° C. Analysis calculated for C, 60.68; H, 9.40; N, 5.44; P, 12.04. Found: C, 60.36; H, 9.61; N, 5.55; P, 12.19.

EXAMPLE III

*Carbamoyldiphenylphosphine carbamoyldiphenylphosphine oxide*

A solution of 7.4 grams of diphenylphosphine in 40 cubic centimeters of acetic acid is treated, under nitrogen, with 6.5 grams of KOCN in 20 cubic centimeters of $H_2O$. After 1 hour at reflux, two layers form which are separated when cooled. The lower layer (about 50 cubic centimeters) is poured onto 200 cubic centimeters of $H_2O$. After standing, 2.4 grams of product carbamoyldiphenylphosphine (26 percent) precipitates. Recrystallization of this product from 2:1 benzene-hexane gives an analytical sample, melting point 115° C.–116° C.

Analysis calculated for C, 68.12; H, 5.28; N, 6.11; P, 13.52. Found: C, 68.04; H, 5.59; N, 5.93; P, 13.45.

Addition of the upper layer to water deposits 1.5 grams of solid, which on recrystallization from a benzene and hexane mixture has a melting point of 190° C.–191° C., and analyzes as carbamoyldiphenylphosphine oxide.

Analysis calculated for C, 63.67; H, 4.93; N, 5.71. Found: C, 63.32; H, 5.48; N, 5.76.

EXAMPLE IV

*Carbamoyl-bis(2-cyanoethyl)phosphine oxide*

A solution of 14.0 grams of bis(2-cyanoethyl)-phosphine in 40 cubic centimeters of acetic acid is treated, under nitrogen, with 16.2 grams of KOCN in 27 cubic centimeters of water at 60° C. After evolution of gas has ceased, the solution is cooled and treated with 10 cubic centimeters of concentrated $H_2SO_4$. $K_2SO_4$ precipitates and is filtered, and the filtrate is evaporated to dryness. Extraction of the residue with boiling methanol gives 6.8 grams (34 percent) of product carbamoyl-bis(2-cyanoethyl)phosphine oxide, melting point 168° C.–171° C. An analytical sample thereof recrystallizes from methanol, melting point 179° C.–180° C., and has the following analysis: Calculated for C, 42.21; H, 5.06; N, 21.10; P, 15.55. Found: C, 42.54; H, 4.92; N, 20.81; P, 15.85.

EXAMPLES V–XV

The following table further illustrates the present invention, reaction having been made to take place essentially as in Example I, above, except as indicated in the table.

cyclohexyl, substituted and unsubstituted phenyl, wherein the substituents for alkyl are selected from the group consisting of cyano, phenyl, halogen and lower alkoxy and the substituents for phenyl are selected from the group consisting of cyano, lower alkyl, halogen and lower alkoxy, and $n$ is selected from 0 to 1.

2. Carbamoyldibutylphosphine oxide.
3. Carbamoyldicyclohexylphosphine.
4. Carbamoyldiphenylphosphine.
5. Carbamoyldiphenylphosphine oxide.
6. Carbamoyl-bis(2-cyanoethyl)phosphine oxide.

7. A method which comprises bringing into reactive contact under substantially anaerobic conditions a secondary phosphine of the formula $$R_1R_2PH$$

and (iso)cyanic acid and recovering the corresponding tertiary phosphine of the formula $$R_1R_2PCONH_2$$

$R_1$ and $R_2$ in the above formulae each representing a member selected from the group consisting of substituted and unsubstituted alkyl having from 1 to 18 carbon atoms, cyclopentyl, cyclohexyl, substituted and unsubstituted phenyl, wherein the substituents for alkyl are selected from the group consisting of cyano, phenyl, halogen and lower alkoxy and the substituents for phenyl are selected from the group consisting of cyano, lower alkyl, halogen and lower alkoxy.

8. The process of claim 7 wherein said tertiary phosphine product is reactively contacted with an oxidizing agent to form the corresponding tertiary phosphine oxide of the formula $$R_1R_2\overset{O}{\overset{\|}{P}}CONH_2$$

TABLE I $$R_1R_2PH + (Iso)\text{cyanic acid} \longrightarrow R_1R_2PCONH_2/ + O \longrightarrow R_1R_2\overset{O}{\overset{\|}{P}}CONH_2$$

| Example | $R_1 R_2$ | (Iso)cyanic acid source | Temp., °C. | Water | Solvent | $R_1 R_2$ | Oxidizing agent | $R_1 R_2$ |
|---|---|---|---|---|---|---|---|---|
| V | Dimethyl | KOCN+acetic acid. | −10 | $H_2O$ | | Dimethyl | Hydrogen peroxide. | Dimethyl. |
| VI | Dioctyl | NaOCN+propionic acid. | 50 | $H_2O$ | | Dioctyl | Air | Dioctyl. |
| VII | Dibenzyl | KOCN+propionic acid. | 70 | None | $CH_3CN$ | Dibenzyl | do | Dibenzyl. |
| VIII | Dicyclopentyl | (Iso)cyanic acid gas. | 85 | None | $CH_3CN$ | Dicyclopentyl | $H_2SO_4$ | Dicyclopentyl. |
| IX | Bis(paramethylphenyl). | do | 100 | None | Dioxane | Bis(paramethylphenyl). | Air | Bis(paramethylphenyl). |
| X | Bis(trifluoromethyl. | KOCN+acetic acid. | 40 | None | Tetrahydrofuran. | Bis(trifluoromethyl). | do | Bis(trifluoromethyl). |
| XI | Didodecyl | NaOCN+HCl | 110 | $H_2O$ | | Didodecyl | Hydrogen peroxide. | Didodecyl. |
| XII | Diisobutyl | KOCN+HCl | 60 | $H_2O$ | | Diisobutyl | Air | Diisobutyl. |
| XIII | Bis(2-cyanoethyl) | (Iso)cyanic acid gas. | 42 | $H_2O$ | | Bis(2-cyanoethyl) | do | Bis(2-cyanoethyl). |
| XIV | Bis(parachlorophenyl). | do | 78 | $H_2O$ | | Bis(parachlorophenyl). | do | Bis(parachlorophenyl). |
| XV | Bis(2-butoxyethyl). | do | 20 | $H_2O$ | | Bis(2-butoxyethyl). | do | Bis(2-butoxyethyl). |

Clearly, the instant discovery encompasses numerous modifications within the skill of the art. Consequently, while the present invention has been described in detail with respect to specific embodiments thereof, it is not intended that these details be construed as limitations upon the scope of the invention, except insofar as they appear in the appended claims.

We claim:

1. A monocarbamoyl-substituted tertiary organic phosphine of the formula $$R_1R_2\overset{(O)_n}{\overset{\|}{P}}CONH_2$$

wherein $R_1$ and $R_2$ each represent a member selected from the group consisting of substituted and unsubstituted alkyl having from 1 to 18 carbon atoms, cyclopentyl, 9. The process of claim 7 wherein reaction is made to take place in an aqueous medium.

10. The process of claim 7 wherein reaction is made to take place in the presence of an inert organic solvent.

11. The process of claim 7 in which the (iso)cyanic acid reactant is generated in situ from an alkali metal isocyanate in the presence of an acid.

References Cited by the Examiner

UNITED STATES PATENTS 3,116,315 12/63 Rauhut _____ 260—557 XR
3,116,316 12/63 Rauhut _____ 260—557 XR
3,157,701 11/64 Speziale _____ 260—558

CHARLES B. PARKER, *Primary Examiner.*

UNITED STATES PATENT OFFICE
CERTIFICATE OF CORRECTION

Patent No. 3,214,457                        October 26, 1965

Grace Peters Papp et al.

It is hereby certified that error appears in the above numbered patent requiring correction and that the said Letters Patent should read as corrected below.

Column 1, lines 12 to 14, the formula should appear as shown below instead of as in the patent:

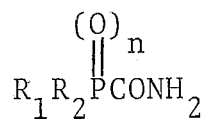

Signed and sealed this 5th day of July 1966.

(SEAL)
Attest:

ERNEST W. SWIDER                          EDWARD J. BRENNER
Attesting Officer                               Commissioner of Patents

UNITED STATES PATENT OFFICE
CERTIFICATE OF CORRECTION

Patent No. 3,214,457                                        October 26, 1965

Grace Peters Papp et al

It is hereby certified that error appears in the above numbered patent requiring correction and that the said Letters Patent should read as corrected below.

Column 1, lines 12 to 14, the formula should appear as shown below instead of as in the patent:

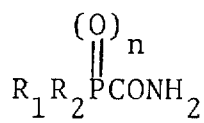

Signed and sealed this 5th day of July 1966.

(SEAL)
Attest:

ERNEST W. SWIDER                                     EDWARD J. BRENNER
Attesting Officer                                             Commissioner of Patents